United States Patent [19]
Xie et al.

[11] Patent Number: 5,805,631
[45] Date of Patent: Sep. 8, 1998

[54] BLUE, GREEN, ORANGE, AND RED UPCONVERSION LASER

[75] Inventors: Ping Xie, San Jose, Calif.; Timothy R. Gosnell, Sante Fe, N. Mex.

[73] Assignee: The Regents of the University of California, Oakland, Calif.

[21] Appl. No.: 686,831

[22] Filed: Jul. 26, 1996

Related U.S. Application Data

[63] Continuation-in-part of Ser. No. 302,558, Sep. 8, 1994, abandoned.

[51] Int. Cl.$^6$ .................................................. H01S 3/14
[52] U.S. Cl. ...................................................... 372/68
[58] Field of Search ................................ 372/20, 40, 41, 372/68

[56] References Cited

U.S. PATENT DOCUMENTS

5,530,709  6/1996  Waarts et al. ............................... 372/6
5,677,920  10/1997  Waarts et al. ............................... 372/6

*Primary Examiner*—Rodney B. Bovernick
*Assistant Examiner*—Robert E. Wise
*Attorney, Agent, or Firm*—Milton D. Wyrick

[57] ABSTRACT

A laser for outputting visible light at the wavelengths of blue, green, orange and red light. This is accomplished through the doping of a substrate, such as an optical fiber or waveguide, with $Pr^{3+}$ ions and $Yb^{3+}$ ions. A light pump such as a diode laser is used to excite these ions into energy states which will produce lasing at the desired wavelengths. Tuning elements such as prisms and gratings can be employed to select desired wavelengths for output.

24 Claims, 11 Drawing Sheets

BLUE, GREEN, ORANGE, AND RED UPCONVERSION LASER

This a continuation-in-part application out of U.S. Pat. application Ser. No. 08/302,558, filed Sept. 8, 1994, now abandoned.

This invention was made with Government support under Contract No. W-7405ENG-36 awarded by the U.S. Department of Energy. The Government has certain rights in the invention.

FIELD OF THE INVENTION

The present invention generally relates to upconversion laser systems, and, more specifically to solid state upconversion laser systems capable of operating in the blue-green wavelength region at room temperature.

Data storage devices are currently a $50 billion per year industry, in which the United States and Japan are the primary suppliers. Although it is now only a small portion of this total market, optical recording and read out, such as is employed for compact discs is the most promising new technology in this field. One of the key elements for successful commercialization of high density optical storage devices is a short-wavelength solid state laser operating in the blue-green wavelength region. Blue lasers permit approximately 4 or more times as much information to be placed on a compact disc than is possible with the infrared lasers currently being used in compact disc players.

High brightness compact blue lasers are also needed badly by the multi-billion dollar per year color display industry. Many other important applications for these lasers are in the areas of color printing, entertainment and biomedical industries. Biomedical applications include instrumentation for photodynamic therapy and flow cytometry.

The prior art basically takes three approaches to the production of compact solid state blue-green lasers. The first is the II–VI semiconductor laser diodes such as the ZnS and ZnSe diodes. However, these types of blue-green laser diodes can operate for only a few minutes at room temperature before damage occurs. It has been estimated that stable room temperature operation of blue-green laser diodes will not be demonstrated until the year 2000.

The second approach uses second harmonic generation or sum frequency generation of infrared laser diodes using nonlinear crystals. This approach is very complex, and stable laser output is not easy to achieve. This instability characteristic of the doubled diode output is well known as the "Green Problem."

The third approach employs energy upconversion by excited state absorption or energy transfer such as singly doped $Pr^{3+}$ or $Tm^{3+}$ fluoride fiber lasers. However, the laser systems demonstrated to date usually require two lasers for pumping. Additionally, the excitation wavelengths are not readily obtained with currently available diode lasers. To achieve the goal of a compact solid state blue-green wavelength laser, it is imperative that semiconductor diode lasers be used as pump sources.

The present invention utilizes a combination of energy transfer and excited state absorption to produce multicolor laser output at the blue, green, red, and orange wavelengths. The gain medium can be pumped by a single semiconductor laser diode with its wavelength falling in the range of 780 nm to 900 nm. The simplicity of the present invention allows it to be easily built into a small package at a potentially low cost. But, primarily, the present invention is the first laser system that can be pumped by a single laser and produce a multicolor visible output.

It is therefore an object of the present invention to provide laser apparatus capable of producing the blue, green, red and orange wavelengths.

It is another object of the present invention to provide a multicolor output laser which can be pumped by a single semiconductor diode laser.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the invention comprises a laser for producing visible output at multiple wavelengths including the wavelengths of blue, green, orange and red light comprising a substrate doped with $Pr^{3+}$ ions and $Yb^{3+}$ ions having a proximal end and a distal end, and reflectance means in optical communication with the proximal end and the distal end of the substrate for providing optical feedback. A light pump is in optical communication with the substrate for pumping the $Pr^{3+}$ ions and the $Yb^{3+}$ ions at a wavelength lying between 780 nm and 900 nm. The $Yb^{3+}$ ions are excited and transfer energy to the $Pr^{3+}$ ions and the $Pr^{3+}$ ions are excited to an energy level from which the $Pr^{3+}$ ions lase at multiple wavelengths including the wavelengths of blue, green, orange and red light.

In a further aspect of the present invention, and in accordance with its objects and purposes, a laser for producing visible output at multiple wavelengths including the wavelengths of blue, green, orange and red light comprises an optical fiber doped with $Pr^{3+}$ ions and $Yb^{3+}$ ions having a proximal end and a distal end, and reflectance means in optical communication with the proximal end and the distal end of the optical fiber for providing optical feedback. A light pump is in optical communication with the optical fiber for pumping the $Pr^{3+}$ ions and the $Yb^{3+}$ ions at a wavelength lying between 780 nm and 900 nm. The $Yb^{3+}$ ions are excited and transfer energy to the $Pr^{3+}$ ions and the $Pr^{3+}$ ions are excited to an energy level from which the $Pr^{3+}$ ions lase at multiple wavelengths including the wavelengths of blue, green, orange and red light.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

The present invention provides an apparatus for the laser output of visible light in the blue, green, red and orange wavelengths. It involves a laser system having an optical fiber or waveguide doped with $Pr^{3+}$ and $Yb^{3+}$ ions.

In the invention, the host substrate material, be it optical fiber, waveguide, or other substrate, can be a crystalline material or glass or a combination of both. A light pump, typically a single semiconductor laser, energizes the $Pr^{3+}$ ions to produce population inversion originating from the $Pr^{3+}$ $^3P_0, ^3P_1, ^3P_2$ or $^1I_6$ energy states. Laser output can be generated at the blue (~491 nm), green (515–540 nm), red (~635 nm), and orange (605–622 nm), and infrared (715, 885, and 910 nm) wavelengths. As stated, the laser system can be energized by a single light pump, with the excitation wavelength falling anywhere within the range of 780 nm to 900 nm.

Figure 1:
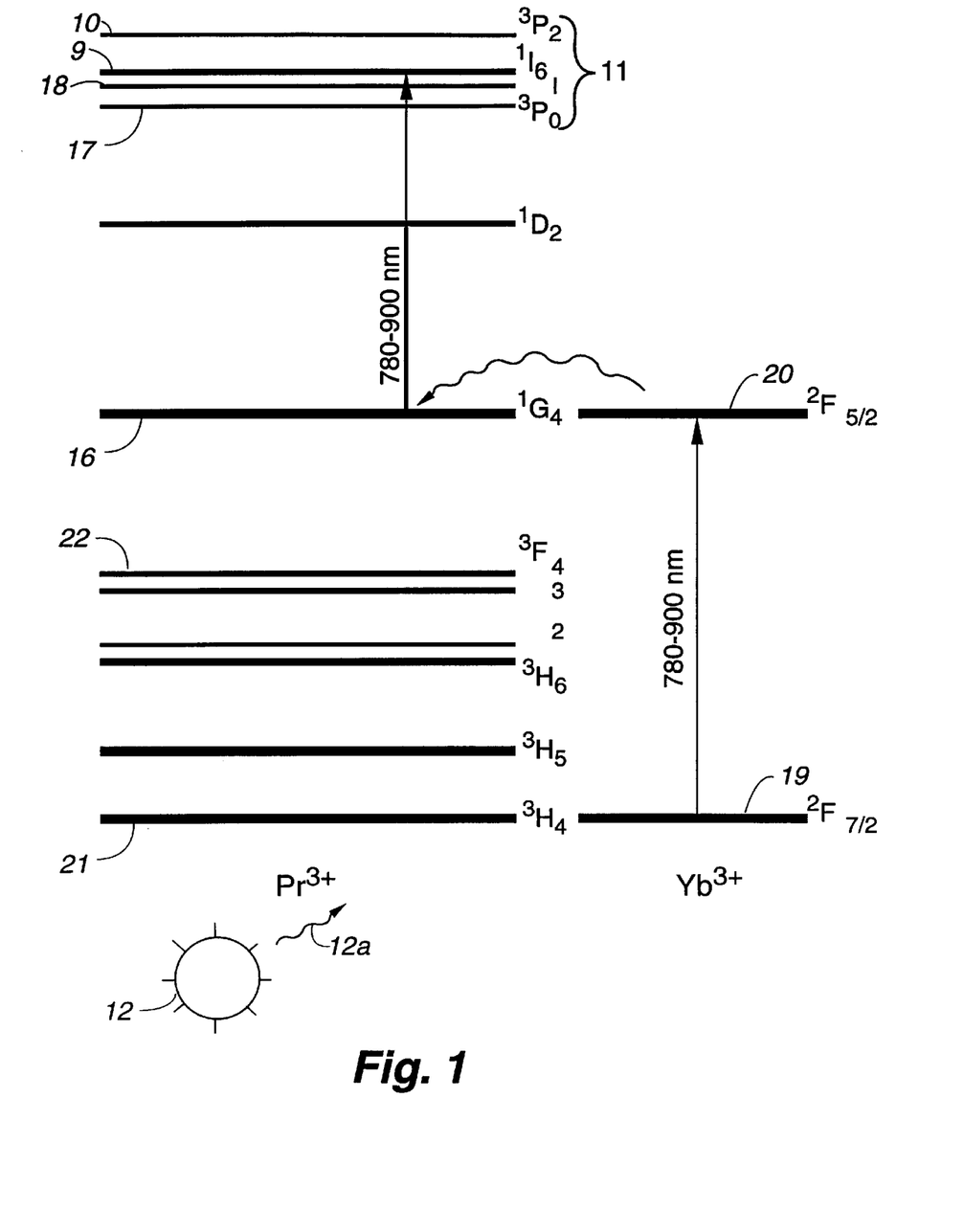
FIG. 1 is an energy diagram which illustrates the energy-transfer-assisted excited-state absorption process of the current invention.
Figure 2:
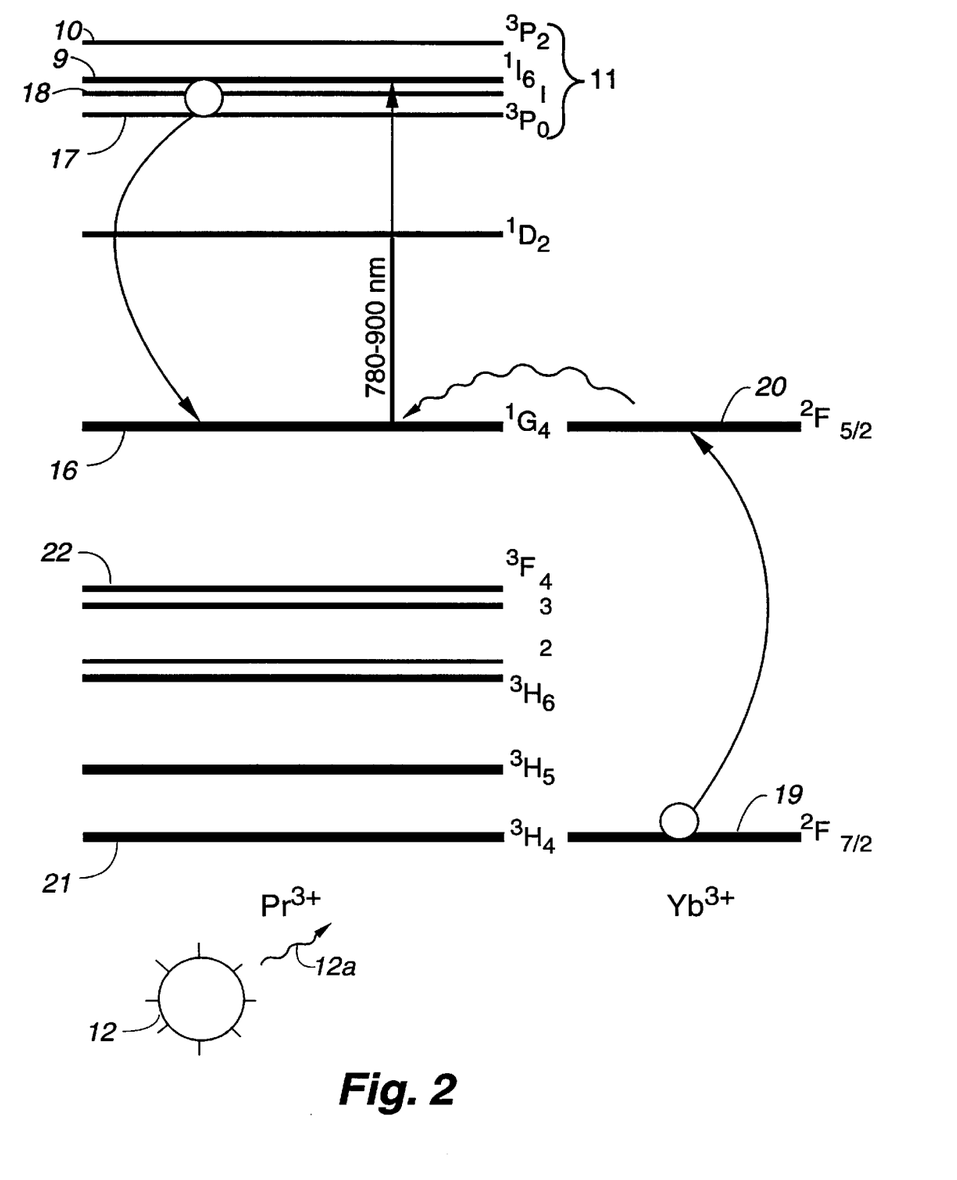
FIG. 2 is an energy diagram, similar to FIG. 1 for $Pr^{3+}$ ions and $Yb^{3+}$ ions pumped at wavelengths falling within the range of 780–900 nm, illustrating the photon-avalanche mechanism according to the present invention.

The excitation procedures of the present invention are illustrated in detail in FIGS. 1 and 2. In FIG. 1, the energy-transfer-assisted excited-state absorption process is illustrated. As illustrated, this process involves tuning light output 12a of light pump 12 to a wavelength strongly absorbed by the $Yb^{3+}$ energy level $^2F_{7/2\ 19} \rightarrow$ energy level $^2F_{5/2}$ 20, and simultaneously absorbed by $Pr^{3+}$ ion transitions $^1G_4$ 16 $\rightarrow ^3P_0$ 17, $^3P_1$ 18, $^3P_2$ 10 or $^1I_6$ 9 energy levels (hereinafter referred to as $^3P-^1I$ manifold 11). The $Yb^{3+}$ ions will absorb energy first, and will be excited from energy level $^2F_{7/2\ 19}$ to energy level $^2F_{5/2}$ 20. Energy at energy level $^2F_{5/2}$ 20 will thereafter be transferred to $Pr^{3+}$ ion energy level $^1G_4$ 16, and subsequently be excited to $^3P-^1I$ manifold 11 by additional absorption of pump light 12a. This process can be better understood by reference to the following:

$^2F_{7/2}(Yb^{3+})$Ground State Absorption>$^2F_{5/2}(Yb^{3+})$Energy Transfer>$^1G_4(Pr^{3+})$, $^1G_4(Pr^{3+})$Excited State Absorption>$^3P-^1I$ manifold($Pr^{3+}$).

By this three-step process, a large population is created in $^3P-^1I$ manifold 11 of the $Pr^{3+}$ ions.

The photon-avalanche mechanism of excitation is illustrated in FIG. 2. This pumping mechanism begins with the three-step process described above. It continues with a step called cross relaxation.

In this step, a $Pr^{3+}$ ion decays from $Pr^{3+}$ $^3P-^1I$ manifold 11 to energy level $^1G_4$, and by energy transfer, one $Yb^{3+}$ ion is simultaneously raised from energy level $^2F_{7/2}$ 19 to energy level $^2F_{5/2}$. The ion at the $Yb^{3+}$ energy level $^2F^{5/2}$ 20 will subsequently transfer energy to the $Pr^{3+}$ energy level $^1G_4$ 16 of a second $Pr^{3+}$ ion by returning to the ground state $^2F_{7/2}$ 19. This process is referred to as a 2 for 1 process. This pumping mechanism concludes with absorption of pump light 12a to excite $Pr^{3+}$ ions from energy level $^1G_4$ 16 to $^3P-^1I$ manifold 11.

Stated differently, the process starts with one ion at the $Pr^{3+}$ energy level $^1G_4$ 16. Through excited state absorption of the $Pr^{3+}$ energy level $^1G_4$ 16 to $^3P-^1I$ manifold 11, the cross relaxation process between $Pr^{3+}$ and $Yb^{3+}$ and the subsequent energy transfer from $Yb^{3+}$ energy level $^2F_{5/2}$ to $Pr^{3+}$ energy level $^1G_4$ 16 results in two $Pr^{3+}$ ions occupying the $Pr^{3+}$ energy level $^1G_4$ 16 at the end of the first cycle.

Similarly, with the two ions occupying the $Pr^{3+}$ energy level $^1G_4$ 16 at the beginning of the second cycle, there will be 4 ions occupying the $Pr^{3+}$ energy level $^1G_4$ 16 at the end of the second cycle. This process proceeds for many cycles in a chain reaction which is called the photon-avalanche process. It can be represented by the following:

These two pumping mechanisms may both contribute to the buildup of population at the $Pr^{3+}$ ion $^3P-^1I$ manifold 11. Whether one process dominates the other depends on the relative concentrations of $Pr^{3+}$ ions and $Yb^{3+}$ ions. With sufficiently high concentrations of $Pr^{3+}$ ions and $Yb^{3+}$ ions, cross relaxation and energy transfer become efficient, and the photon-avalanche process most likely dominates. At sufficiently low concentrations of $Pr^{3+}$ ions and $Yb^{3+}$ ions, cross relaxation may not be efficient, and the energy-transfer-assisted excited state absorption will likely dominate. It is also possible that two $Yb^{3+}$ ions at energy level $^2F_{5/2}$ 20 transfer energy simultaneously to a $Pr^{3+}$ ion and excite it from energy level $^3H_4$ 21 to $^3P-^1I$ manifold 11. However, it does not appear that this process is as efficient as the two previously discussed processes. In the present invention, with 0.3 wt% $Pr^{3+}$ ions and 2.0 wt% $Yb^{3+}$ ions, as in most cases, it is likely that both of these processes contribute to the gain buildup.

Figure 3:
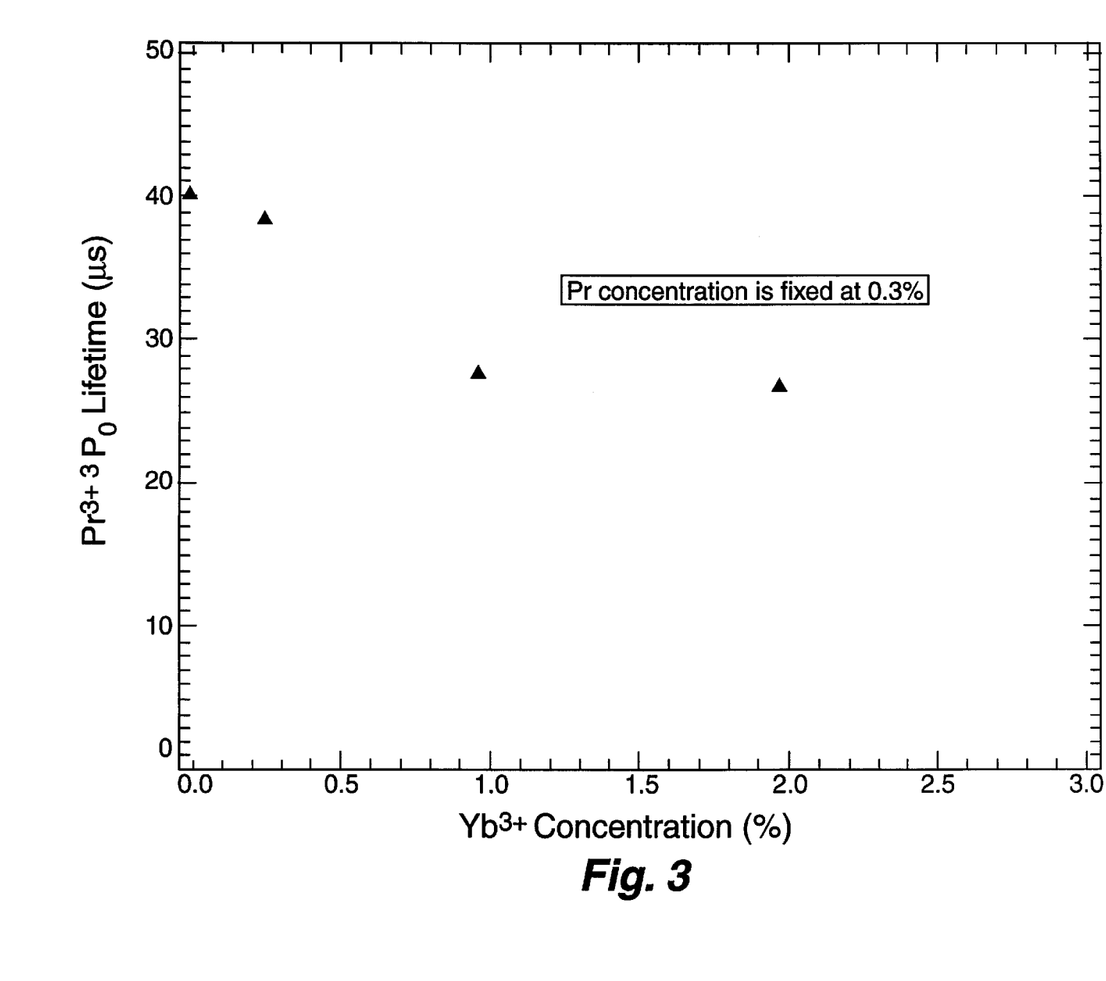
FIG. 3 is a plot of $Pr^{3+}$ $^3P_0$ lifetime versus $Yb^{3+}$ concentration at a fixed concentration of $Pr^{3+}$ at 0.3 wt%.

In FIG. 3 there appears a plot showing the relationship between the lifetime of the $Pr^{3+}$ ion energy level $^3P_0$ (in $\mu$sec) and $Yb^{3+}$ ion concentration. As illustrated, with $Pr^{3+}$ ion concentration fixed at 0.3 wt%, increasing the $Yb^{3+}$ ion concentration from 0 to 2.0 wt% decreases the $Pr^{3+}$ ion energy level $^3P_0$ lifetime from 40 $\mu$sec to 26 $\mu$sec. This quenching of the $Pr^{3+}$ ion lifetime by the $Yb^{3+}$ ion concentration suggests that the cross relaxation between $Pr^{3+}$ ions and $Yb^{3+}$ ions can be very efficient, and validates the photon-avalanche process.

Energy transfer from $Yb^{3+}$ ions to $Pr^{3+}$ ions (FIGS. 1 and 2) occurs when an excited $Yb^{3+}$ ion at energy level $^2F_{5/2}$ 20 migrates rapidly among the lattice structure of the $Yb^{3+}$ ions until it encounters a nearby $Pr^{3+}$ ion and energy is thereafter transferred from energy level $^2F_{5/2}$ 20 of the $Yb^{3+}$ ion to energy level $^1G_4$ 16 of the $Pr^{3+}$ ion. This part of the process can be expressed by the following:

where "A" and "B" label different $Yb^{3+}$ ions at different sites.

Figure 4:
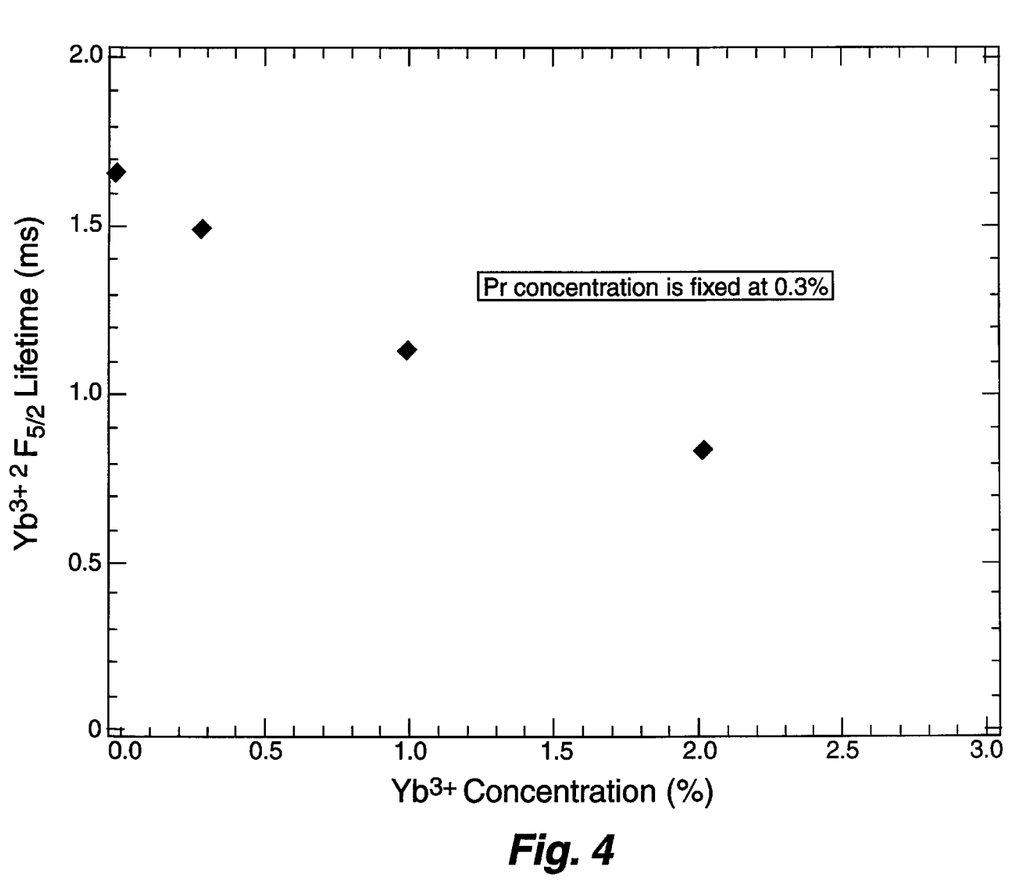
FIG. 4 is a plot of $Yb^{3+}$ $^2F_{5/2}$ lifetime versus $Yb^{3+}$ concentration at a fixed concentration of $Pr^{3+}$ at 0.3 wt%.
Figure 5:
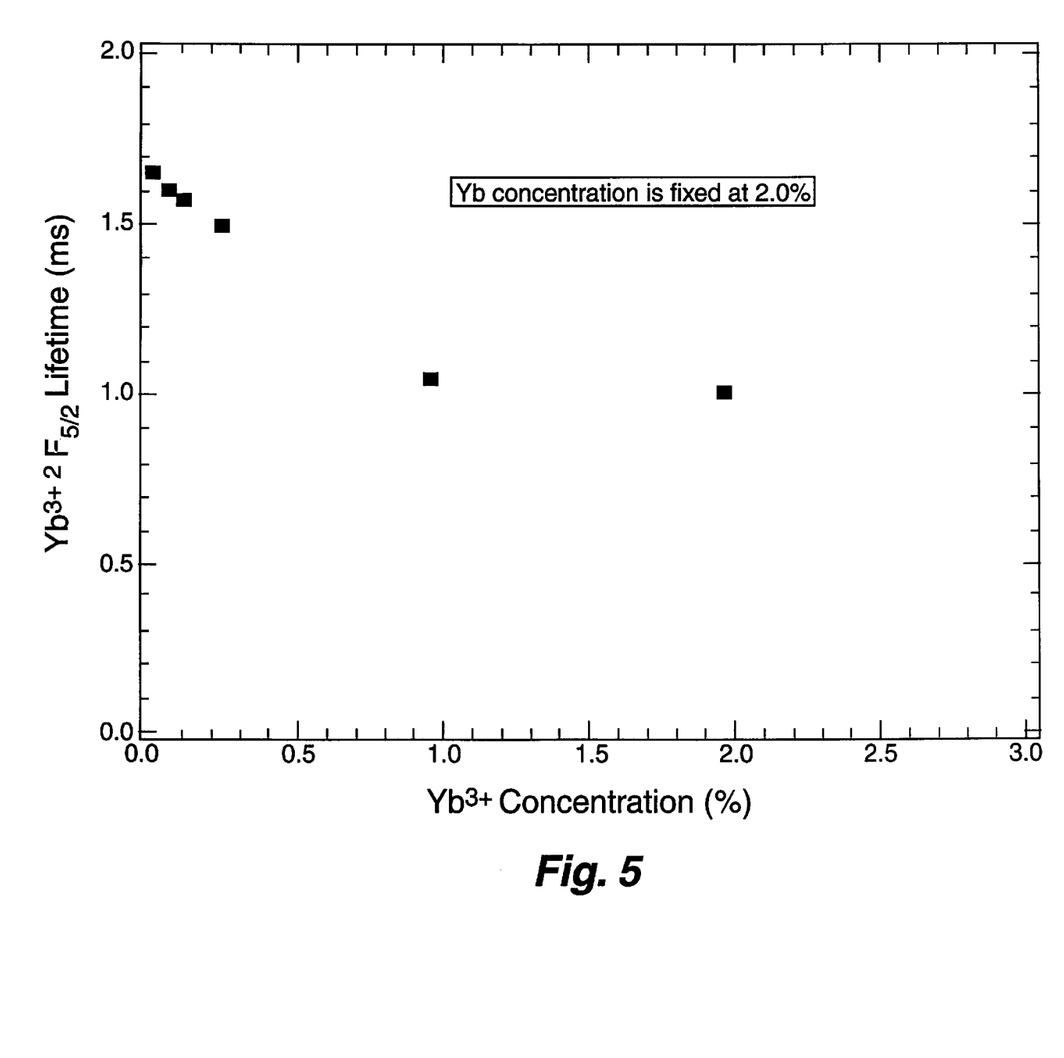
FIG. 5 is a plot of $Yb^{3+}$ $^2F_{5/2}$ lifetime versus $Pr^{3+}$ concentration at a fixed concentration of $Yb^{3+}$ at 2.0 wt%.

As is illustrated in FIG. 4, at a fixed concentration of $Pr^{3+}$ ions at 2.0 wt%, the lifetime of energy level $^2F_{5/2}$ 20 (FIG. 1) of the $Yb^{3+}$ ions decreases significantly as the concentration of $Yb^{3+}$ ions increases. As illustrated in FIG. 5, at a fixed concentration of $Yb^{3+}$ at 0.3 wt%, the lifetime of energy level $^2F_{5/2}$ 20 of the $Yb^{3+}$ ions decreases significantly as the concentration of $Pr^{3+}$ ions increases. This decrease in the lifetime of energy level $^2F_{5/2}$ 20 of the $Yb^{3+}$ ions suggests efficient energy transfer from $Yb^{3+}$ ions to $Pr^{3+}$ ions. Calculations using the data from FIGS. 4 and 5 have indicated that the energy transfer efficiency from the $Yb^{3+}$ ions to the $Pr^{3+}$ ions can be as high as 56%.

It should be noted, however, that there is a special subgroup of $Yb^{3+}$ ions that is most likely to participate with the $Pr^{3+}$ ions in the photon avalanche process. This subgroup consists of those $Yb^{3+}$ ions which are in close proximity to the $Pr^{3+}$ ions, thus producing higher energy transfer efficiency than the average of 56% discussed above.

Figure 6:
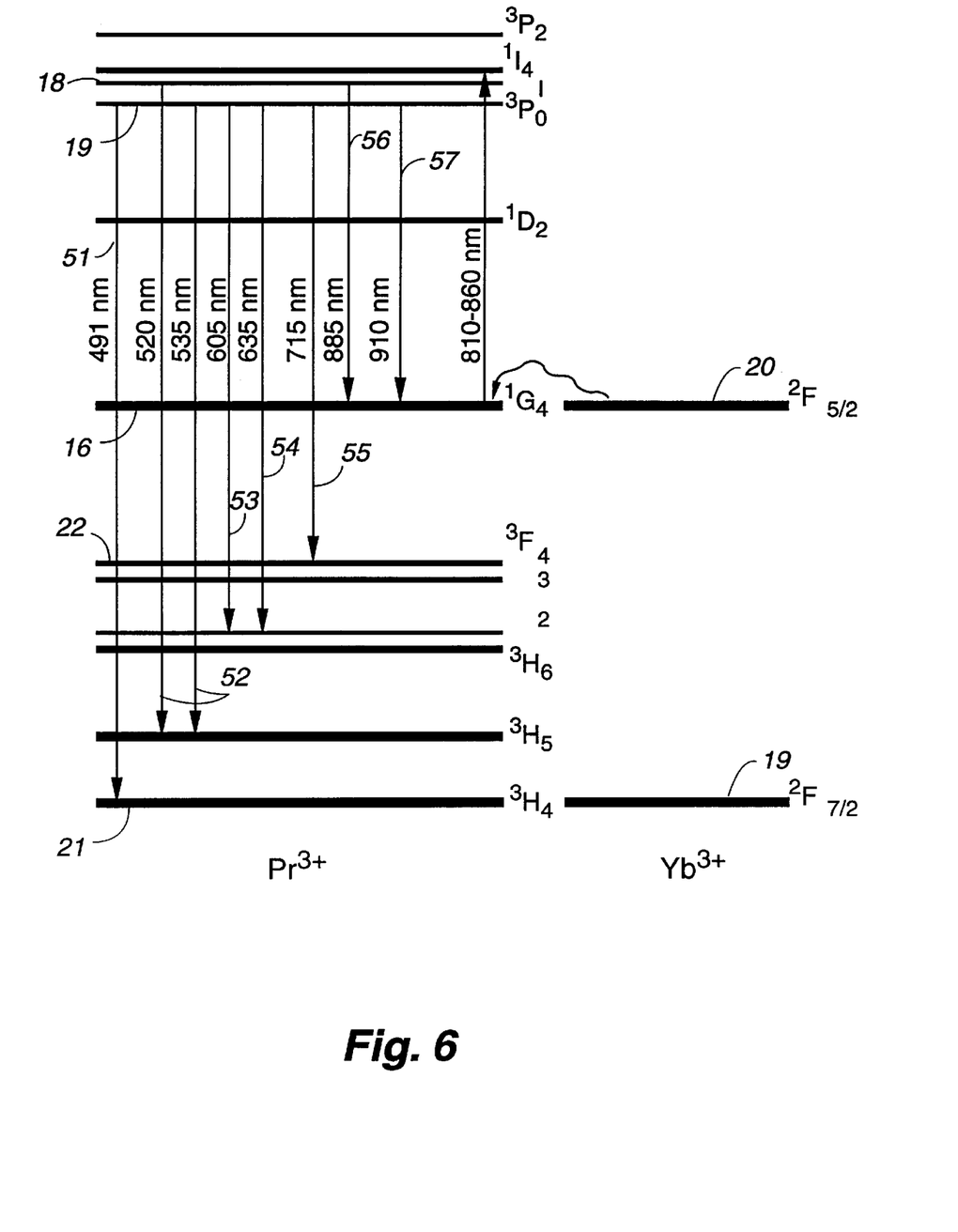
FIG. 6 is an energy diagram illustrating the optical gain wavelengths of the present invention when pumped as shown in FIGS. 1 and 2.

Using the pumping schemes illustrated in FIGS. 1 and 2, population inversion originating from $^3P-^1I$ manifold 11 can be achieved. Optical gain can be generated, as illustrated in FIG. 6, with pumping at wavelengths of 780–900 nm, at the wavelengths of 491 nm ($^3P_0 \to ^3H_4$)51; 515–540 nm ($^3P_0$, $^3P_1 \to ^3H_5$)52; 605 nm ($^3P_0 \to ^3H_6$)53; 635 nm ($^3P_0, \to ^3F_2$) 54; 715 nm ($^3P_0 \to ^3F_4$)55; 885 nm ($^3P_1 \to ^1G_4$)56; and 910 nm ($^3P_0 \to ^1G_4$) 57. The above described optical gains can be employed either to generate laser output or to provide amplifier gain at the desired stated wavelengths.

The present invention can also be made into a superluminescence source which does not produce coherent signal oscillation or amplification, but instead, generates amplified spontaneous emission. In other words, no optical feedback is provided for laser generation and no coherent input signal is provided for amplification. Instead, it amplifies its own spontaneous emission. In this configuration, the present invention exhibits lower coherence than a typical laser output. The output is much like spontaneous emission, but is much brighter.

The host material for the $Pr^{3+}$ ions and the $Yb^{3+}$ ions of the present invention can be composed of one of the following materials: fluoride based glasses, such as ZBLAN®, ZBLA® and others; halides; chalcogenides, such as $As_2S_3$; chalco-halides; fluoride crystal, such as $LaF_3$ or $Ba_3Y_2F_3$; lanthanum halide crystal, such as $LaBr_3$ or $LaCl_3$; or vanadate crystals, such as $YVO_4$ or $GdVO_4$.

Light pump 12 (FIG. 1) can be a semiconductor diode laser, or another type of laser such as a $Ti:Al_2O_3$ laser, or an incoherent light source such as a light emitting diode (LED), or a combination of the above. Since the excitation wavelength of the present invention lies between 780 nm and 900 nm, the exact pumping wavelength is not critical for the performance of the laser. The broad excitation spectrum is ideal for either laser diode pumping or for LED pumping.

Figure 7:
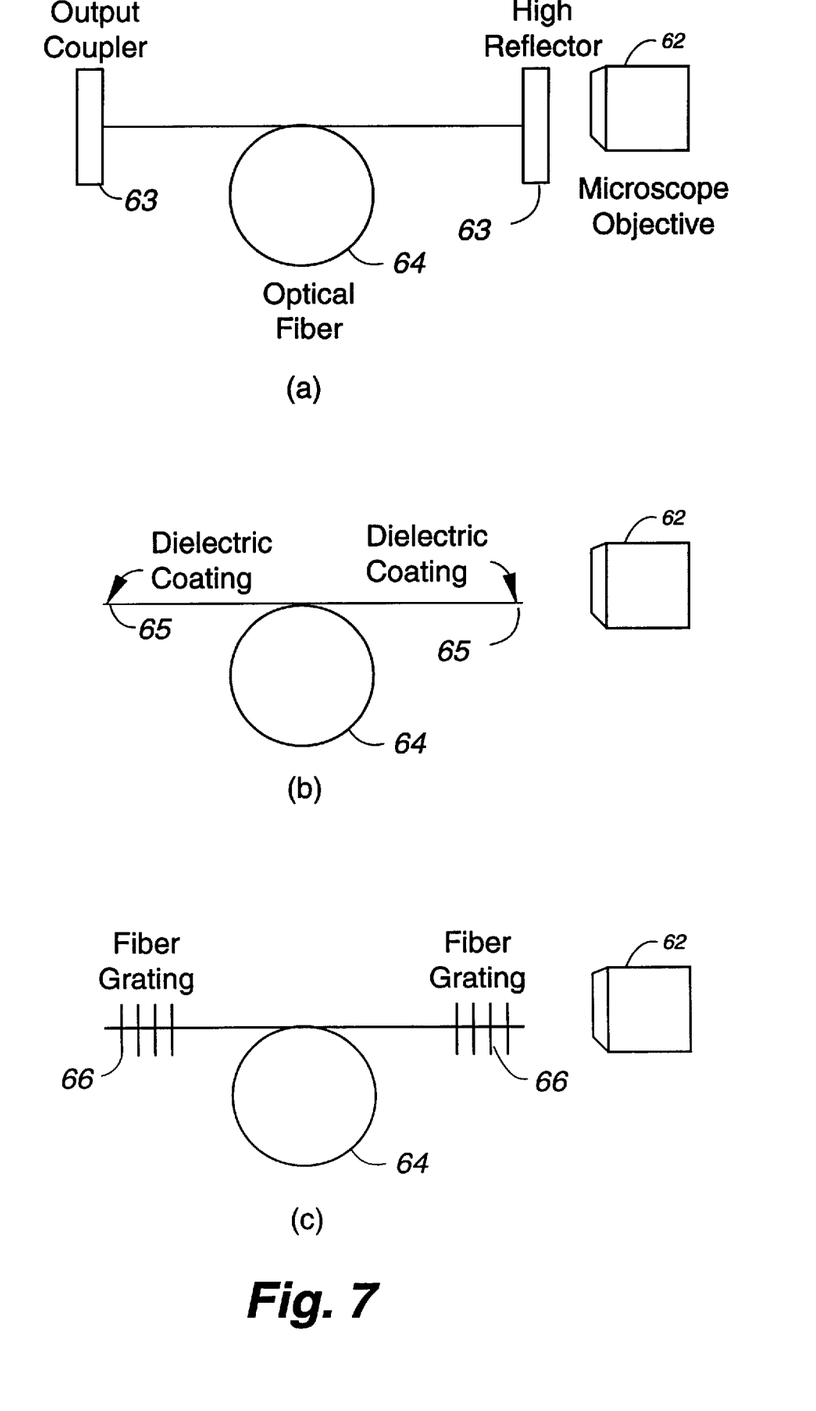
FIGS. 7a, 7b, and 7c are schematic illustrations of methods of pumping the present invention using high reflectance mirrors at (a), dielectric coatings at (b), and fiber gratings at (c) at the ends of an optical fiber or other waveguide.

Possible configurations for applying light output 12a from light pump 12 (FIG. 1) in the present invention are illustrated in FIG. 7. As shown, light output 12a is launched into optical fiber 64, which is the host substrate in this embodiment, through objective lens 62, and through high reflector 63. Objective lens 62 can be a microscope objective lens, a ball lens, or in any other lens system which is capable of focusing an amount of light output 12a into optical fiber 64 which is sufficient to produce the described energy transfers.

Optical feedback for the present invention is provided by butting the fiber ends directly against the high reflecting dielectric mirrors 63 as shown at (a) of FIG. 7, or by applying dielectric coating 65 directly to the ends of optical fiber 64 as shown at (b) of FIG. 7. If desired, fiber grating mirrors 66 can be fused onto the ends of optical fiber 64, or fiber grating mirrors 66 could be written by laser pulses directly onto optical fiber 64 near its ends to form a laser cavity, as shown at (c) of FIG. 7.

Figure 8:
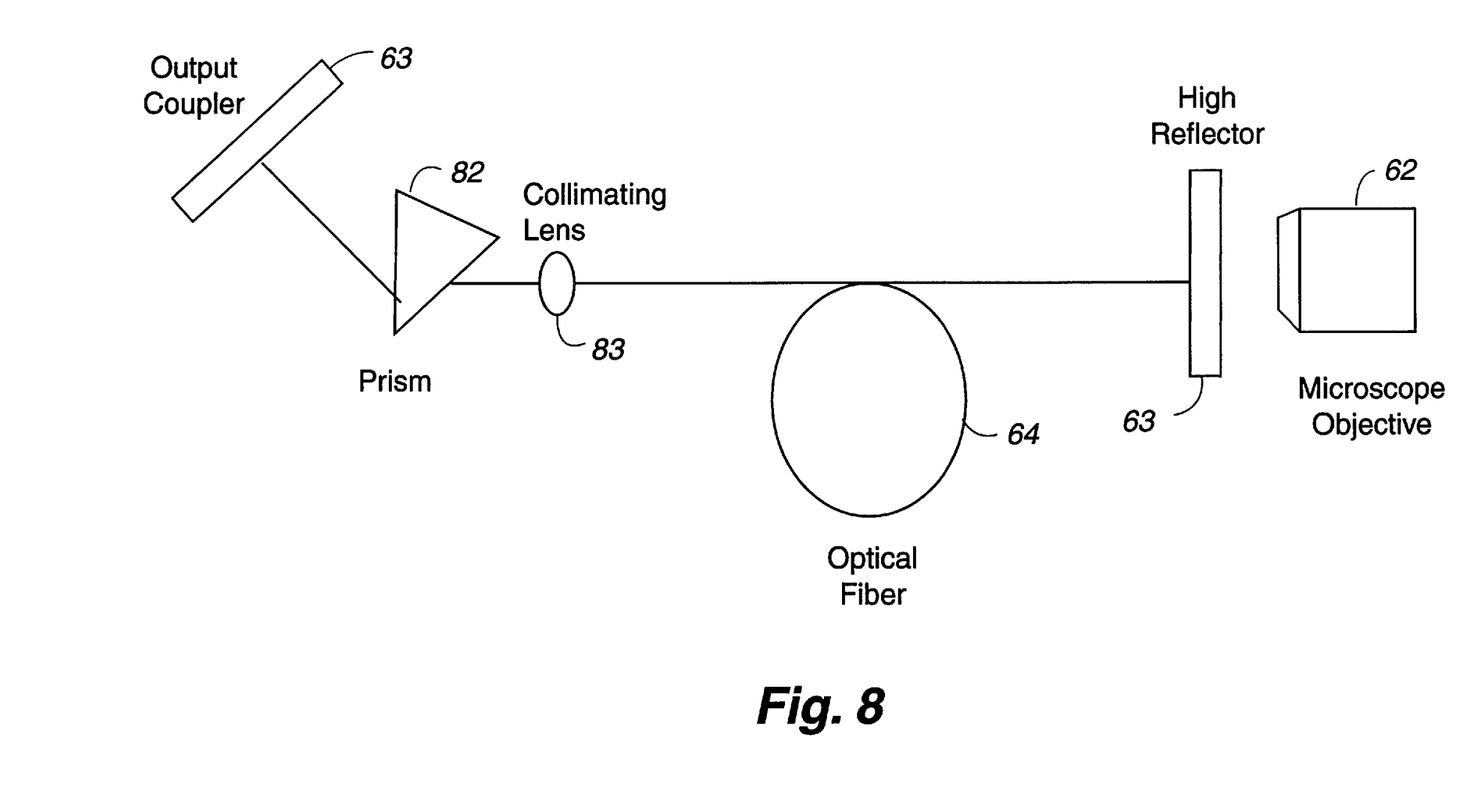
FIG. 8 is a schematic illustration of a configuration of the present invention in which the output wavelength can be tuned by an intracavity tuning element such as a prism.

As shown in FIG. 8, the output wavelength of the laser according to the present invention can be selected or tuned by using an intracavity tuning element 82 including collimating lens 83, which can take the form of prism, fiber grating or birefringent tuner, although tuning element 82 is represented in FIG. 8 as a prism. For example, in the case of prism tuning as tuning element 82, and because a prism is a dispersive element, rotation of the prism or end mirror 83 will allow selection of different wavelength light to be fed back into optical fiber 64. This selected wavelength light will lase, provided the feedback is enough to overcome losses.

Reflective mirrors 63, 65, and 66 (FIG. 7) can be coated in a fashion which will allow this high feedback (high reflection) at the desired wavelength and introduce losses (high transmission) at other undesired wavelengths. The low loss wavelength light will consume all of the optical gain, and suppress all other wavelengths of light.

The concentration of $Pr^{3+}$ and $Yb^{3+}$ ions in the present invention is extremely important for the realization of efficient laser performance. Others have reported that at high concentrations of $Yb^{3+}$ ions, and even though energy transfer from the $Yb^{3+}$ ion energy level $^2F_{5/2}$ 20 (FIG. 1) to the $Pr^{3+}$ energy level $^1G_4$, 16 (FIG. 1) becomes more efficient, energy back transfer from the $Pr^{3+}$ ions to the $Yb^{3+}$ ions also becomes very fast, which will eventually decrease the effective net energy transfer efficiency from the $Yb^{3+}$ ion energy level $^2F_{5/2}$ 20 to the $Pr^{3+}$ ion energy level $^1G_4$ 16.

It has also been previously claimed that at high $Pr^{3+}$ ion concentration, concentration quenching of the $Pr^{3+}$ ion energy level $^1G_4$ 16 will depopulate energy level $^1G_4$ 16 very rapidly. However, it is demonstrated with the present invention that at high $Yb^{3+}$ ion concentration, energy back transfer from the $Pr^{3+}$ ions to the $Yb^{3+}$ ions does not occur as quickly as was claimed by others. In fact, this back transfer is negligible compared to the forward energy transfer rate from the $Yb^{3+}$ ions to the $Pr^{3+}$ ions as experienced with the present invention.

Figure 9:
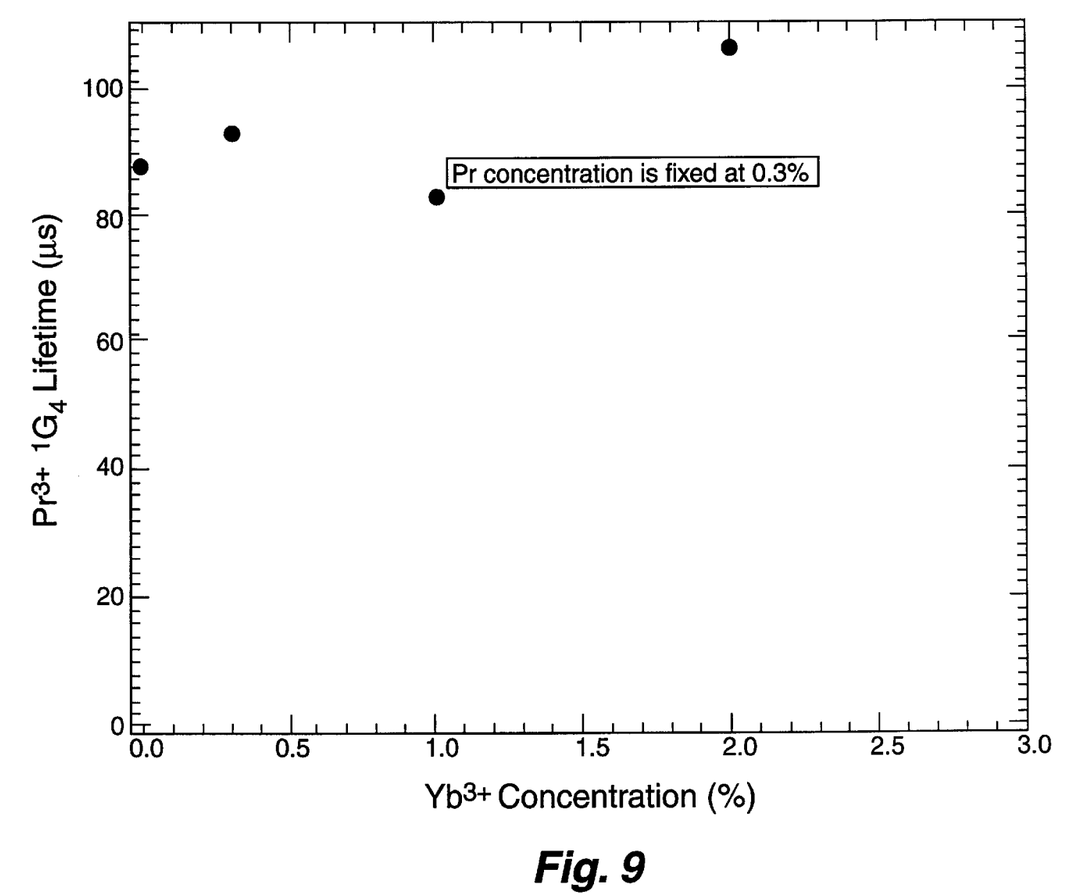
FIG. 9 is a plot of $Pr^{3+}$ $^1G_4$ lifetime versus $Yb^{3+}$ concentration at a fixed concentration of $Pr^{3+}$ at 0.3 wt%.
Figure 10:
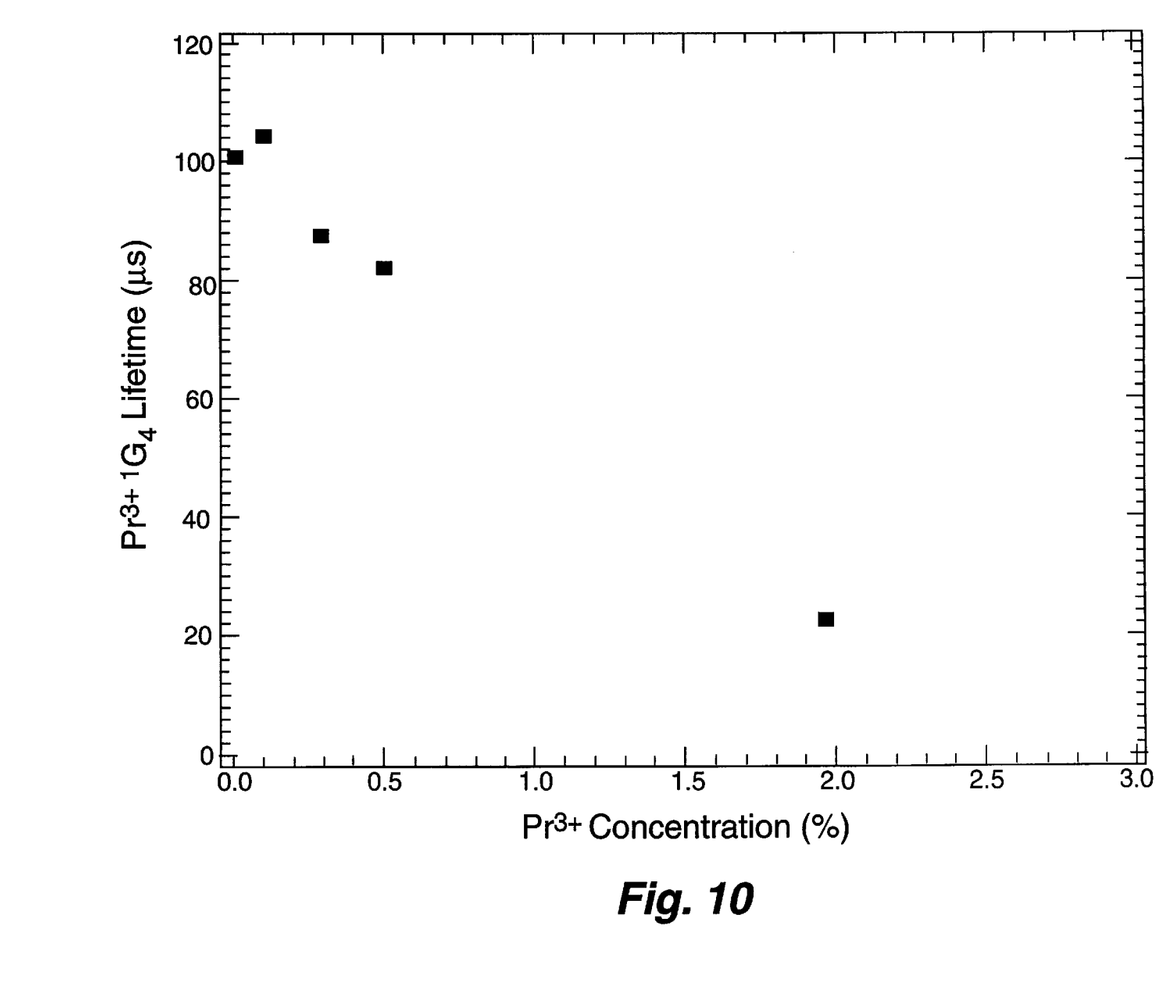
FIG. 10 is a plot of $Pr^{3+}$ $^1G_4$ lifetime versus $Pr^{3+}$ concentration at a fixed concentration of $Pr^{3+}$ at 0.3 wt%.

As is shown in FIG. 9, with a fixed 0.3 wt% concentration of $Pr^{3+}$ ions, the $Pr^{3+}$ ion energy level $^1G_4$ 16. lifetime is not changed within experimental error as the concentration of $Yb^{3+}$ ions increases. Concentration quenching of the $Pr^{3+}$ ion energy level $^1G_4$ 16 can be examined by plotting its lifetime versus its concentration as is done in FIG. 10. As shown, the lifetime begins to fall off at 1000 ppm wt% concentration, which indicates the beginning of concentration quenching as described by others.

Figure 11:
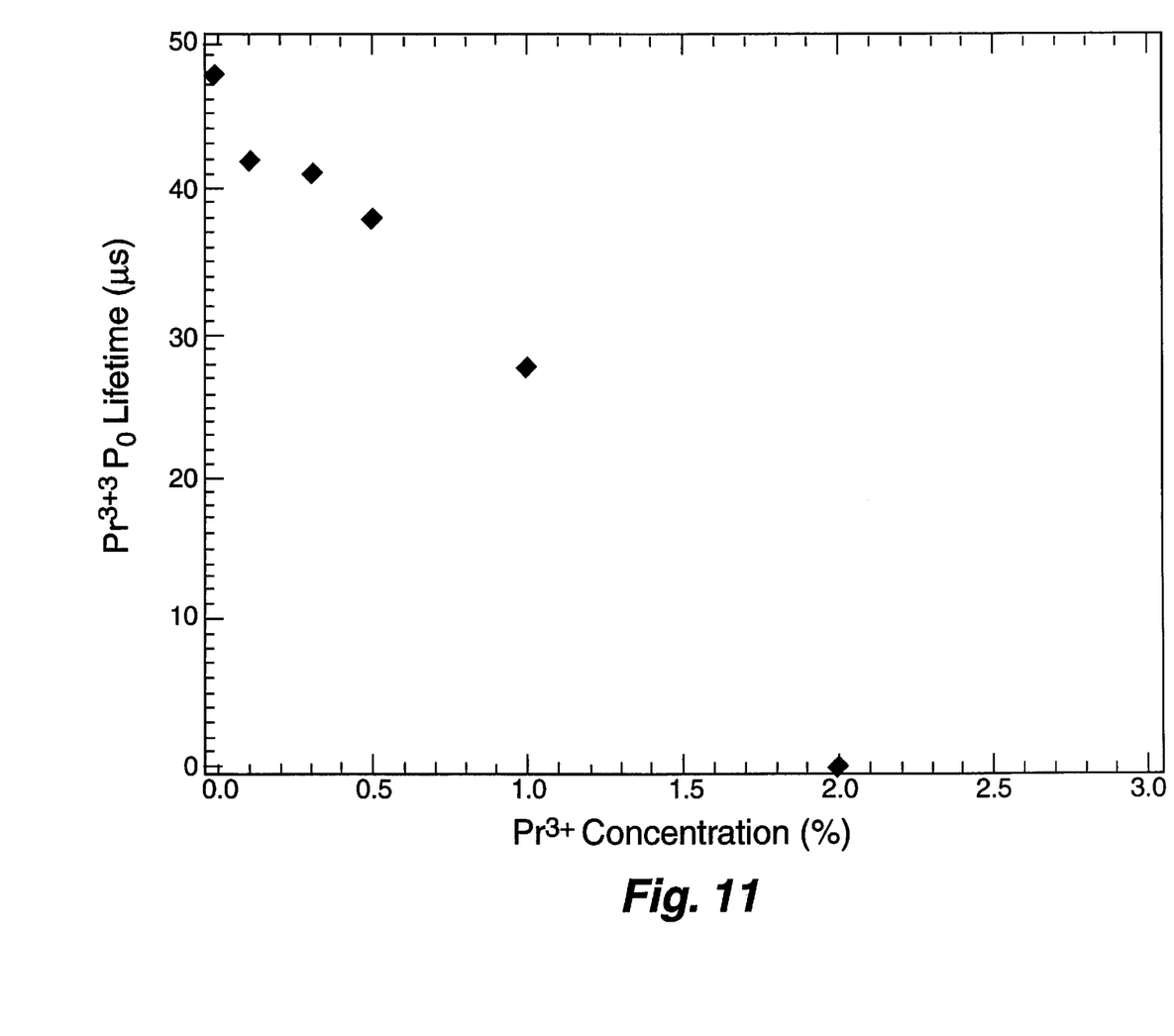
FIG. 11 is a plot of $Pr^{3+}$ $^3P_0$ lifetime versus $Pr^{3+}$ concentration.

Self-concentration quenching of the $Pr^{3+}$ ion energy level $^3P_0$ 17 (FIG. 1) lifetime as a function of $Pr^{3+}$ ion concentration is examined in FIG. 11. As seen, the lifetime of $Pr^{3+}$ ion energy level $^3P_0$ 17 decreases as the concentration of $Pr^{3+}$ ions increases. This self-concentration quenching effect suggests that high $Pr^{3+}$ ion concentration is not always desirable, because the decrease of $Pr^{3+}$ ion energy level $^3P_0$ 17 lifetime will lower the optical gain of the upconversion laser of the present invention.

It should be understood that upconversion energy transfer from the $Yb^{3+}$ ions to the $Pr^{3+}$ ions in the present invention is an important step in producing the required population inversion at the $Pr^{3+}$ ion $^3P-^1I$ manifold 11. To achieve efficient energy transfer from the $Yb^{3+}$ ions to the $Pr^{3+}$ ions, as illustrated in FIGS. 4 and 5, it is necessary to use a high concentration (>0.5%) of $Yb^{3+}$ ions, and a relatively high concentration (>0.05%) of $Pr^{3+}$ ions. At these relatively high concentrations of $Yb^{3+}$ ions and $Pr^{3+}$ ions, cross relaxation between the $Pr^{3+}$ ion $^3P-^1I$ manifold 11 and the $Yb^{3+}$ ion energy level $^2F_{7/2}$ 20 (FIG. 1) also becomes efficient, enhancing the photon avalanche process.

As previously stated, that there is a special subgroup of $Yb^{3+}$ ions that is most likely to participate with the $Pr^{3+}$ ions in the photon avalanche process. This subgroup consists of those $Yb^{3+}$ ions which are in close proximity to the $Pr^{3+}$ ions, thus producing higher energy transfer efficiency than the average of 56% discussed above.

The optimal concentration of $Pr^{3+}$ ions should be determined by considering the following factors: self-concentration quenching of $Pr^{3+}$ ion energy level $^3P_0$ 17, and energy level $^1G_4$ 16 (FIG. 1) lifetimes; the $Yb^{3+}$ to $Pr^{3+}$ energy transfer efficiency; and cross relaxation. Of course, the present invention seeks low concentration quenching and high energy transfer efficiency. However, low concentration quenching requires low $Pr^{3+}$ concentration, and high energy transfer efficiency requires high $Pr^{3+}$ concentration. For the present invention, the optimal $Pr^{3+}$ concentration falls within the range of 0.05–0.5 wt%.

In the case of $Yb^{3+}$ concentration, concentration quenching does not occur because of the simple energy level structures of $Yb^{3+}$. It should be clear that higher $Yb^{3+}$ concentration is desirable to achieve high energy transfer efficiency. Of course, the upper limit of $Yb^{3+}$ concentration is limited by the optical quality of the host material. Often, at high dopant concentration, high optical loss is induced due to strain, and host material defects.

Energy back transfer from the $Pr^{3+}$ ions to the $Yb^{3+}$ ions is not observed in the present invention. However, at high $Pr^{3+}$ ion concentration which is to enhance energy transfer from the $Yb^{3+}$ ions to the $Pr^{3+}$ ions, the concentration quenching effect of the $Pr^{3+}$ ions at energy level $^1G_4$ (FIG. 1) becomes an important loss factor. Also, since the value for the energy difference, AE, between energy level $^1G_4$ 16 and the next lower energy level $^3F_4$ 22 is approximately 3000 $cm^{-1}$, the multiphonon relaxation rate of the $Pr^{3+}$ ions energy level $^1G_4$ 16 cannot be neglected even in a low phonon material such as ZBLAN® glass.

To overcome these fast decay processes such as multiphonon relaxation and concentration quenching of the $Pr^{3+}$ ions energy level $^1G_4$ 16, two important considerations must be observed in practicing the present invention. The first is that a low phonon glass, such as ZBLAN® glass, should be chosen as the host material in order to minimize the multiphonon relaxation effect.

The second is that the laser active medium should be drawn into an optical fiber or waveguide geometry. Since light output 12a (FIG. 1) is confined in a small area in the optical fiber or waveguide over a long interaction length, high light intensity is achieved over a long interaction range. At this high intensity level, excited state absorption at the $Pr^{3+}$ ions energy level $^1G_4$ 16 becomes very efficient in competing with the multiphonon relaxation rate and with the concentration quenching rate. It is this high intensity that enables the high doping concentration of the $Pr^{3+}$ ions into the host material, allowing the present invention to achieve efficient energy transfer without the deterioration of upconversion efficiency caused by concentration quenching and multiphonon relaxation of the $Pr^{3+}$ ions energy level $^1G_4$ 16.

The present invention requires only minimal output power from light pump 12 (FIG. 1). Powers of only tens of mw are satisfactory for operation of the invention, but much higher power outputs are possible according to the application.

To summarize, the present invention can lase at multiple wavelengths within the blue, green, orange and red wavelength range in 0.3 wt% $Pr^{3+}$ ions/2.0 wt% $Yb^{3+}$ in a low phonon host material. The unoptimized optical power in the visible spectrum can easily reach a few hundred mW. The optical power output is of course a function of the power of optical pump 12 (FIG. 1). In contrast, a typical optical power requirement for high end optical data storage is only 10–20 mW.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A laser for producing visible output at multiple wavelengths including the wavelengths of blue, green, orange and red visible light comprising:

a substrate doped with $Pr^{3+}$ ions to a concentration of less than 0.5 wt% and greater than 0.05 wt%, and $Yb^{3+}$ ions to a concentration of greater than 0.5 wt%, and having a proximal end and a distal end; and reflectance means in optical communication with said proximal end and said distal end of said substrate for providing optical feedback;

light pump means in optical communication with said proximal end of said substrate for producing an excitation beam and pumping said $Pr^{3+}$ ions and said $Yb^{3+}$ ions at a wavelength lying between 780 nm and 900 nm, said excitation beam exciting populations of said $Yb^{3+}$ ions which thereafter transfer energy to populations of said $Pr^{3+}$ ions which are independently excited by said excitation beam to an energy level from which said populations of said $Pr^{3+}$ ions and said populations of said $Yb^{3+}$ ions participate in a photon avalanche process which increases said populations of said $Pr^{3+}$ ions at said energy level, said populations of said $Pr^{3+}$ ions lasing at said multiple wavelengths of blue, green, orange and red visible light; and tuning element means in optical communication with said multiple wavelengths of blue, green, orange and red visible light for selecting one or more of said multiple wavelengths of blue, green, orange and red visible light for output.

2. The laser as described in claim 1 wherein said light pump means comprises a semiconductor diode laser.

3. The laser as described in claim 1, wherein said substrate comprises a low phonon glass.

4. The laser as described in claim 1 wherein said substrate comprises an optical fiber.

5. The laser as described in claim 1 wherein said substrate comprises a waveguide.

6. The laser as described in claim 1 wherein said reflectance means comprises high reflectance dielectric mirrors.

7. The laser as described in claim 1 wherein said reflectance means comprises a dielectric coating applied to said proximal and distal ends of said substrate.

8. The laser as described in claim 1 wherein said reflectance means comprises fiber grating mirrors fused onto said proximal and distal ends of said substrate or directly written onto said optical fiber by laser pulses near said proximal and distal ends of said substrate.

9. The laser as described in claim 1 wherein said tuning element means comprises an intracavity prism in optical communication with said distal end of said substrate.

10. The laser as described in claim 1 wherein said tuning element means comprises fiber grating mirrors fused onto said distal end of said substrate or directly written onto said optical fiber by laser pulses near said distal end of said substrate.

11. The laser as described in claim 1 wherein said tuning element means comprises an intracavity birefringent tuner in optical communication with said distal end of said substrate.

12. The laser as described in claim 1 wherein said substrate is doped with $Yb^{3+}$ ions to a concentration of more than 2.0 wt%.

13. The laser as described in claim 1 wherein said substrate is doped with $Pr^{3+}$ ions to a concentration of 0.3 wt%.

14. A laser for producing visible output at multiple wavelengths including the wavelengths of blue, green, orange and red visible light comprising:

an optical fiber doped with $Pr^{3+}$ ions to a concentration of less than 0.5 wt% and greater than 0.05 wt%, and $Yb^{3+}$ ions to a concentration of more than 0.5 wt%, having a proximal end and a distal end; and reflectance means in optical communication with said proximal end and said distal end of said optical fiber for providing optical feedback;

light pump means in optical communication with said optical fiber for producing an excitation beam and pumping said $Pr^{3+}$ ions and said $Yb^{3+}$ ions at a wavelength lying between 780 nm and 900 nm, said excitation beam exciting populations of said $Yb^{3+}$ ions which thereafter transfer energy to populations of said $Pr^{3+}$ ions which are independently excited by said excitation beam to an energy level from which said populations of said $Pr^{3+}$ ions and said populations of said $Yb^{3+}$ ions participate in a photon avalanche process which increases said populations of said $Pr^{3+}$ ions at said energy level, said populations of said $Pr^{3+}$ ions lasing at said multiple wavelengths of blue, green, orange and red visible light; and tuning element means in optical communication with said wavelengths of blue, green, orange and red visible light for selecting one or more of said wavelengths of blue, green, orange and red visible light for output.

15. The laser as described in claim 14, wherein said light pump means comprises a semiconductor diode laser.

16. The laser as described in claim 14 wherein said reflectance means comprises high reflectance dielectric mirrors.

17. The laser as described in claim 14 wherein said reflectance means comprises a dielectric coating applied to said proximal and distal ends of said substrate.

18. The laser as described in claim 14 wherein said reflectance means comprises a fiber grating mirrors fused onto said proximal and distal ends of said substrate or directly written onto said optical fiber by laser pulses near said proximal and distal ends of said substrate.

19. The laser as described in claim 14 wherein said tuning element means comprises an intracavity prism in optical communication with said distal end of said substrate.

20. The laser as described in claim 14 wherein said tuning element means comprises fiber grating mirrors fused onto said distal end of said substrate or directly written onto said optical fiber by laser pulses near said distal end of said substrate.

21. The laser as described in claim 14 wherein said tuning element means comprises an intracavity birefringent tuner in optical communication with said distal end of said substrate.

22. The laser as described in claim 14 wherein said optical fiber is doped with $Yb^{3+}$ ions to a concentration of more than 2.0 wt%.

23. The laser as described in claim 14 wherein said optical fiber is doped with $Pr^{3+}$ ions to a concentration of 0.3 wt%.

24. The laser as described in claim 14 wherein said optical fiber comprises a low phonon glass.

* * * * *